United States Patent
Zhao et al.

(10) Patent No.: US 11,871,083 B2
(45) Date of Patent: Jan. 9, 2024

(54) VIDEO STREAM PLAYBACK CONTROL METHOD, DEVICE, AND STORAGE MEDIUM

(71) Applicant: BEIJING BYTEDANCE NETWORK TECHNOLOGY CO., LTD., Beijing (CN)

(72) Inventors: Dongyang Zhao, Beijing (CN); Zixuan Ma, Beijing (CN); Xin Liu, Beijing (CN)

(73) Assignee: DOUYIN VISION CO., LTD., Beijing (CN)

(*) Notice: Subject to any disclaimer, the term of this patent is extended or adjusted under 35 U.S.C. 154(b) by 0 days.

(21) Appl. No.: 17/886,848

(22) Filed: Aug. 12, 2022

(65) Prior Publication Data

US 2022/0385981 A1 Dec. 1, 2022

Related U.S. Application Data

(63) Continuation of application No. PCT/CN2021/076703, filed on Feb. 18, 2021.

(30) Foreign Application Priority Data

Mar. 20, 2020 (CN) .......................... 202010203442.1

(51) Int. Cl.
*H04N 21/472* (2011.01)
*H04N 21/431* (2011.01)
(Continued)

(52) U.S. Cl.
CPC ..... *H04N 21/47217* (2013.01); *H04N 21/431* (2013.01); *H04N 21/4312* (2013.01); *H04N 21/4363* (2013.01); *H04N 21/4825* (2013.01)

(58) Field of Classification Search
CPC ......... H04N 21/47217; H04N 21/4312; H04N 21/4363; H04N 21/431; H04N 21/42204; H04N 21/47202; H04N 21/485
See application file for complete search history.

(56) References Cited

U.S. PATENT DOCUMENTS

| 10,235,454 B1 | 3/2019 | Lewis et al. |
| 2005/0183017 A1* | 8/2005 | Cain ................. H04N 21/8113 725/40 |

(Continued)

FOREIGN PATENT DOCUMENTS

| CN | 102196091 A | 9/2011 |
| CN | 103686277 A | 3/2014 |

(Continued)

OTHER PUBLICATIONS

International Patent Application No. PCT/CN2021/076703; Int'l Search Report; dated May 7, 2021; 3 pages.

*Primary Examiner* — John R Schnurr
(74) *Attorney, Agent, or Firm* — BakerHostetler

(57) ABSTRACT

A method and an apparatus for controlling video stream playback, and a storage medium are provided. In playing a video stream in a playback region of a mobile display screen, the method includes: obtaining a playback mode switching instruction based on a detected trigger event of a playback mode configuration control; setting a playback mode of the video stream to a target playback mode instructed by the playback mode switching instruction; and in a case that the playback mode of the video stream is set to the automatic playback mode, playing a video content next to a current video content if it is detected that the current video content has been played.

15 Claims, 6 Drawing Sheets

(51) Int. Cl.
  *H04N 21/4363* (2011.01)
  *H04N 21/482* (2011.01)

(56) References Cited

U.S. PATENT DOCUMENTS

| | | | | |
|---|---|---|---|---|
| 2011/0084913 | A1* | 4/2011 | Wirtanen | G06F 3/0346 |
| | | | | 345/173 |
| 2013/0079062 | A1* | 3/2013 | Sirpal | G06F 3/0484 |
| | | | | 455/566 |
| 2014/0301386 | A1* | 10/2014 | Harrenstien | G06F 16/743 |
| | | | | 348/487 |
| 2014/0359446 | A1 | 12/2014 | McIntosh et al. | |
| 2016/0295299 | A1* | 10/2016 | Kang | H04N 21/458 |
| 2017/0118500 | A1* | 4/2017 | Carroll | H04N 21/8133 |
| 2018/0101238 | A1* | 4/2018 | Thomas-Brigden | G06F 3/017 |

FOREIGN PATENT DOCUMENTS

| | | | |
|---|---|---|---|
| CN | 103838536 | A | 6/2014 |
| CN | 103995646 | A | 8/2014 |
| CN | 104159146 | A | 11/2014 |
| CN | 105409228 | A | 3/2016 |
| CN | 108924625 | A | 11/2018 |
| CN | 109104631 | A | 12/2018 |
| CN | 109547835 | A | 3/2019 |
| CN | 109788333 | A | 5/2019 |
| CN | 109889303 | A | 6/2019 |
| CN | 110688571 | A | 1/2020 |
| CN | 111405346 | A | 7/2020 |

\* cited by examiner

VIDEO STREAM PLAYBACK CONTROL METHOD, DEVICE, AND STORAGE MEDIUM

The present application is a continuation of International Patent Application No. PCT/CN2021/076703 filed on Feb. 18, 2021, which claims the priority to Chinese Patent Application No. 202010203442.1, titled "VIDEO STREAM PLAYBACK CONTROL METHOD, DEVICE, AND STORAGE MEDIUM", filed on Mar. 20, 2020, with the Chinese Patent Office, both of which are incorporated herein by reference in their entireties.

FIELD

The embodiments of the present disclosure relate to the technical field of video stream playback, and in particular to a method and an apparatus for controlling video stream playback, and a storage medium.

BACKGROUND

With the development of software and hardware technologies of mobile terminals, mobile terminals represented by smartphones have entered an era of large screens and full screens. With the development of communication technology, many mobile terminal applications, such as social applications that realize social interaction in the form of short videos and live broadcasts and shopping applications that display products in the form of videos and live broadcasts, support the video stream function.

The conventional mobile terminals, such as smart phones, are generally used in a handheld usage scenario. Correspondingly, the video stream playback supported by the application program of the conventional mobile terminal is touch-controlled, that is, the user can control an application program loaded on the mobile terminal by touching the screen, including opening the application, closing the application, and calling a function of the application.

The method for controlling video stream playback by touching screen cannot meet the requirements of emerging usage scenarios such as a non-handheld usage scenario. In the non-handheld usage scenario, it is difficult for the user to touch the screen, increasing the difficulty of controlling the video stream playback. Taking playing a video in a video stream format such as a short video and a live video as an example, after a current video content is played, it is often required for the user to manually operate to switch to a next video content. In a conventional manner, a "next" play button is displayed below the display region of the video content, and then the user may click the play button to switch to the next video content. In another conventional manner, the user may perform a specific sliding operation (such as, sliding up) in the display region to switch to the next video content. However, in the non-handheld usage scenario, it is inconvenient for the user to manually switching video contents frequently, increasing the difficulty of controlling video stream playback.

SUMMARY

According to the embodiments of the present disclosure, a method and an apparatus for controlling video stream playback, and a storage medium are provided to reduce the difficulty of controlling video stream playback in a non-handheld usage scenario.

In a first aspect, a method for controlling video stream playback is provided according to an embodiment of the present disclosure. In playing a video stream in a playback region of a mobile display screen, the method includes: obtaining a playback mode switching instruction based on a detected trigger event of a playback mode configuration control, where a display entry of the playback mode configuration control is located in a fixed menu bar region of the mobile display screen, the playback mode switching instruction instructs to switch a playback mode of the video stream to a target playback mode, the target playback mode includes at least an automatic playback mode in which a video content is automatically switched, and the video stream includes multiple video contents; setting the playback mode of the video stream to the target playback mode instructed by the playback mode switching instruction; and in a case that the playback mode of the video stream is set to the automatic playback mode, playing a video content next to a current video content if it is detected that the current video content has been played.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the method according to the embodiment of the present disclosure, an automatic playback mode is supported. In the automatic playback mode, when it is detected that the current video content is played, the next video content is to be played automatically without requiring the user to manually switch, improving the convenience of the user's operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

Further, the fixed menu bar region includes a left fixed menu bar region and/or a right fixed menu bar region. The left fixed menu bar region is located on a left side of a display region of the mobile display screen, and the right fixed menu bar region is located on a right side of the display region of the mobile display screen.

It is found that when the user holds a mobile terminal, it is more convenient for the user to operate in the region below the display screen than in other regions. Therefore, the fixed menu bar is usually arranged below the display screen. However, in the non-handheld usage scenario, it is often inconvenient for the user to operate in the region below the display screen, and it is convenient for the user to operate on both sides of the display screen. Therefore, in the method according to the embodiments of the present disclosure, the fixed menu bar region is arranged on a left side and/or a right side of the display region of the mobile display screen, so as to facilitate user operations.

Further, the fixed menu bar region displays at least one control. The method according to the embodiment of the present disclosure may further include: obtaining a menu bar display mode switching instruction, and displaying the at least one control in the left fixed menu bar region or the right fixed menu bar region based on the menu bar display mode switching instruction.

In the method according to the embodiments of the present disclosure, the complexity and variability of actual application scenarios are fully considered. In some application scenarios, it is convenient for the user to operate in the region on the left side of the display region; and in other application scenarios, it is convenient for the user to operate in the region on the right side of the display region. In order to meet the requirements of different actual application scenarios, based on a menu bar display mode switching instruction, a control in the fixed menu bar region may be switched to the left fixed menu bar region or the right fixed menu bar region that is convenient for the user to operate.

Based on the method according to any of the above embodiments, in a case that the playback mode of the video stream is set to the automatic playback mode, the method according to the embodiments of the present disclosure further includes: obtaining a target playback instruction, where the target playback instruction is not a touch control instruction detected in the playback region, and the target playback instruction instructs to perform a target playback operation; and performing the target playback operation on the video stream.

In a case that the playback mode of the video stream is set to the automatic playback mode, it may be required for the user to perform other playback control operations on the video stream, such as stopping playing a video content, and resuming playing a video content, and switching video content in a case that a current video content is not finished playing. In order to further improve the convenience of controlling playback and reducing the difficulty of controlling playback, a target playback instruction may be obtained in the method for controlling video stream playback according to the embodiments of the present disclosure. The target playback instruction is not a touch control instruction detected in the playback region of the mobile display screen. A target playback operation is performed based on the target playback instruction to control the playback of the video stream, thereby controlling video stream playback in a non-touch mode. The method is applied in a non-handheld usage scenario, solving the problem of high difficulty of controlling video stream playback caused by touching the screen.

In an embodiment, the obtaining a target playback instruction includes: obtaining the target playback instruction based on a trigger event of the target playback instruction detected by a sensor of an electronic device including the mobile display screen.

In the method according to the embodiment of the present disclosure, the sensor on the electronic device where the mobile display screen is arranged is used to detect a trigger event of the target playback instruction, enriching the manners in which the video stream is controlled, thereby meeting the requirements of the non-handheld usage scenario.

In another embodiment, the obtaining a target playback instruction includes: obtaining the target playback instruction based on a trigger event of the target playback instruction detected by a sensor of an electronic device connected in a local area network where the mobile display screen is located.

In the method according to the embodiment of the present disclosure, the sensor on the electronic device connected in a local area network where the mobile display screen is located is used to detect a trigger event of the target playback instruction, enriching the manners in which the video stream is controlled, thereby meeting the requirements of the non-handheld usage scenario.

In another embodiment, the obtaining a target playback instruction includes: obtaining information received by an electronic device connected in a local area network where the mobile display screen is located, determining a current scenario mode based on the information, determining the current scenario mode as a target scenario mode, and obtaining a target playback instruction corresponding to the target scenario mode.

With the method according to the embodiment of the present disclosure, the manners in which the video stream is controlled are enriched, meeting the requirements of the non-handheld usage scenario.

In a case that the scenario modes corresponding to different information and the target playback instruction corresponding to the target scenario mode are defined in advance, the current scenario mode may be identified during playing the video stream, and the playback of the video stream may be automatically controlled based on the current scenario mode, thereby meeting the requirements of the current scenario.

Based on the method according to any of the above embodiments, the video stream includes multiple video contents, and the method may further include: determining whether a screen display mode of each of the video contents of the video stream matches a screen type of the mobile display screen, and filtering out a video content having a screen display mode not matching the screen type. The screen type includes a horizontal screen type and a vertical screen type, a screen display mode matching the horizontal screen type is a horizontal screen display mode, and a screen display mode matching the vertical screen type is a vertical screen display mode.

With the method according to the embodiments of the present disclosure, the video content that does not match the screen type of the mobile display screen may be filtered out, so that the screen display modes of the played video content are matched with the screen type, thereby improving the user experience and security.

In a second aspect, an electronic apparatus is provided according to an embodiment of the present disclosure. The electronic apparatus includes: a playback instruction obtaining module, a playback operation execution module and a playback mode execution module. In playing a video stream in a playback region of a mobile display screen of the electronic apparatus, the playback instruction obtaining module is configured to obtain a playback mode switching instruction based on a detected trigger event of a playback mode configuration control, where a display entry of the playback mode configuration control is located in a fixed menu bar region of the mobile display screen, the playback mode switching instruction instructs to switch a playback mode of the video stream to a target playback mode, the target playback mode includes at least an automatic playback mode in which a video content is automatically switched, and the video stream includes multiple video contents; the playback operation execution module is configured to set the playback mode of the video stream to the target playback mode instructed by the playback mode switching instruction; and the playback mode execution module is configured to, in a case that the playback mode of the video stream is set to the automatic playback mode, play a video content next to a current video content if it is detected that the current video content has been played.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the electronic apparatus according to the embodiment of the present disclosure, an automatic playback mode is supported. In the automatic playback mode, when it is detected that the current video content is played, the next video content is to be played automatically without requiring the user to manually switch, improving the convenience of the user's operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

Further, the fixed menu bar region includes a left fixed menu bar region and/or a right fixed menu bar region. The left fixed menu bar region is located on a left side of a display region of the mobile display screen, and the right fixed menu bar region is located on a right side of the display region of the mobile display screen.

It is found that when the user holds a mobile terminal, it is more convenient for the user to operate in the region below the display screen than in other regions. Therefore, the fixed menu bar is usually arranged below the display screen. However, in the non-handheld usage scenario, it is often inconvenient for the user to operate in the region below the display screen, and it is convenient for the user to operate on both sides of the display screen. Therefore, in the electronic apparatus according to the embodiments of the present disclosure, the fixed menu bar region is arranged on a left side and/or a right side of the display region of the mobile display screen, so as to facilitate user operations.

Further, the fixed menu bar region displays at least one control. The electronic apparatus according to the embodiment of the present disclosure may further include: a menu bar display mode switching module. The menu bar display mode switching module is configured to obtain a menu bar display mode switching instruction, and display the at least one control in the left fixed menu bar region or the right fixed menu bar region based on the menu bar display mode switching instruction.

In the electronic apparatus according to the embodiments of the present disclosure, the complexity and variability of actual application scenarios are fully considered. In some application scenarios, it is convenient for the user to operate in the region on the left side of the display region; and in other application scenarios, it is convenient for the user to operate in the region on the right side of the display region. In order to meet the requirements of different actual application scenarios, based on a menu bar display mode switching instruction, a control in the fixed menu bar region may be switched to the left fixed menu bar region or the right fixed menu bar region that is convenient for the user to operate.

Based on the electronic apparatus according to any of the above embodiments, the playback instruction obtaining module is further configured to, in a case that the playback mode of the video stream is set to the automatic playback mode, obtain a target playback instruction, where the target playback instruction is not a touch control instruction detected in the playback region, and the target playback instruction instructs to perform a target playback operation; and the playback operation execution module is further configured to, in the case that the playback mode of the video stream is set to the automatic playback mode, perform the target playback operation on the video stream.

In a case that the playback mode of the video stream is set to the automatic playback mode, it may be required for the user to perform other playback control operations on the video stream, such as stopping playing a video content, and resuming playing a video content, and switching video content in a case that a current video content is not finished playing. In order to further improve the convenience of controlling playback and reducing the difficulty of controlling playback, a target playback instruction may be obtained in the electronic apparatus according to the embodiments of the present disclosure. The target playback instruction is not a touch control instruction detected in the playback region of the mobile display screen. A target playback operation is performed based on the target playback instruction to control the playback of the video stream, thereby controlling video stream playback in a non-touch mode. The electronic apparatus is applied in a non-handheld usage scenario, solving the problem of high difficulty of controlling video stream playback caused by touching the screen.

In an embodiment, the playback instruction obtaining module is configured to obtain the target playback instruction based on a trigger event of the target playback instruction detected by a sensor of an electronic device including the mobile display screen.

In the electronic apparatus according to the embodiment of the present disclosure, the sensor on the electronic device where the mobile display screen is arranged is used to detect a trigger event of the target playback instruction, enriching the manners in which the video stream is controlled, thereby meeting the requirements of the non-handheld usage scenario.

In another embodiment, the playback instruction obtaining module is configured to obtain the target playback instruction based on a trigger event of the target playback instruction detected by a sensor of an electronic device connected in a local area network where the mobile display screen is located.

In the electronic apparatus according to the embodiment of the present disclosure, the sensor on the electronic device connected in a local area network where the mobile display screen is located is used to detect a trigger event of the target playback instruction, enriching manners in which the video stream is controlled, thereby meeting the requirements of the non-handheld usage scenario.

In another embodiment, the playback instruction obtaining module is configured to obtain the target playback instruction by: obtaining information received by an electronic device connected in a local area network where the mobile display screen is located, determining a current scenario mode based on the information, determining the current scenario mode as s target scenario mode, and obtaining a target playback instruction corresponding to the target scenario mode.

With the electronic apparatus according to the embodiment of the present disclosure, the manners in which the video stream is controlled are enriched, meeting the requirements of the non-handheld usage scenario.

In a case that the scenario modes corresponding to different information and the target playback instruction corresponding to the target scenario mode are defined in advance, the current scenario mode may be identified during playing the video stream, and the playback of the video stream may be automatically controlled based on the current scenario mode, thereby meeting the requirements of the current scenario.

Based on the electronic apparatus according to any of the above embodiments, the electronic apparatus may further include a video content filtering module. The video content filtering module is configure to determine whether a screen display mode of each of the video contents of the video stream matches a screen type of the mobile display screen, and filter out a video content having a screen display mode not matching the screen type. The screen type includes a horizontal screen type and a vertical screen type, a screen display mode matching the horizontal screen type is a horizontal screen display mode, and a screen display mode matching the vertical screen type is a vertical screen display mode.

With the electronic apparatus according to the embodiments of the present disclosure, the video content that does not match the screen type of the mobile display screen may be filtered out, so that the screen display modes of the played video content are matched with the screen type, thereby improving the user experience and security.

In a third aspect, an electronic device is provided according to an embodiment of the present disclosure. The electronic device includes a processor and a memory. The memory stores a program for executing the method according to any one of the embodiments in the first aspect. The processor is configured to execute the program stored in the memory.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the electronic device according to the embodiment of the present disclosure, an automatic playback mode is supported. In the automatic playback mode, when it is detected that the current video content is played, the next video content is to be played automatically without requiring the user to manually switch, improving the convenience of the user's operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

In a fourth aspect, a computer-readable storage medium is provided according to an embodiment of the present disclosure. The computer-readable storage medium stores a program for executing the method according to any one of the embodiments in the first aspect.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the program stored in the computer-readable storage medium according to the embodiment of the present disclosure, an automatic playback mode is supported. In the automatic playback mode, when it is detected that the current video content is played, the next video content is to be played automatically without requiring the user to manually switch, improving the convenience of the user's operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

DETAILED DESCRIPTION OF THE EMBODIMENTS

In order to better understand the above technical solutions, the technical solutions in the embodiments of the present disclosure are described in detail below with reference to the accompanying drawings and specific embodiments. It should be understood that the embodiments of the present disclosure and the features in the embodiments are detailed descriptions of the technical solutions in the embodiments of the present disclosure, rather than limitations of the technical solutions according to the present disclosure. If there is no conflict, the embodiments of the present disclosure and the technical features in the embodiments may be combined with each other.

Figure 1:
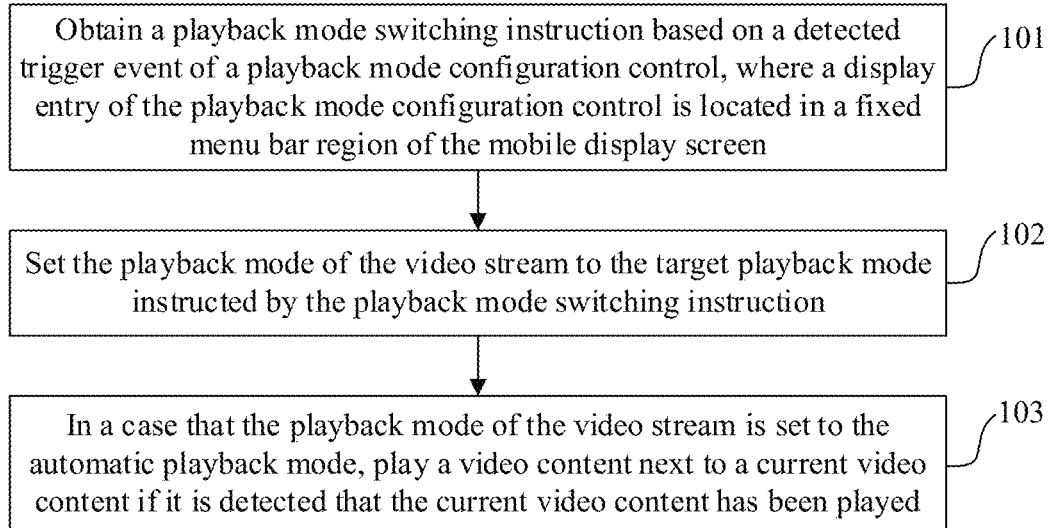
FIG. 1 is a flow chart of a method for controlling video stream playback according to an embodiment of the present disclosure.

A method for controlling video stream playback is provided according to an embodiment of the present disclosure. The method may be performed by an application program that plays a video stream, or may be performed by the application program and a system program of an electronic device installing the application program. As shown in FIG. 1, in playing a video stream in a playback region of a mobile display screen, the method includes the following steps 101 to 103.

In step 101, a playback mode switching instruction is obtained based on a detected trigger event of a playback mode configuration control. A display entry of the playback mode configuration control is located in a fixed menu bar region of the mobile display screen.

The playback mode switching instruction instructs to switch a playback mode of the video stream to a target playback mode.

The target playback mode includes at least: an automatic playback mode in which a video content is automatically switched.

The mobile display screen may include a display screen of a mobile terminal, and may include a movable display screen that is connected to a terminal device and is controlled by the terminal device to display.

The playback region of the mobile display screen is a region in which video contents of the video stream is displayed on the screen.

In an embodiment of the present disclosure, the video stream includes multiple video contents, and playing a video stream includes playing video contents of the video stream.

In the embodiments of the present disclosure, the division of video contents is not limited. In practical applications, the division of video contents is determined according to product requirements. Taking a short video as an example, a complete short video is a video content. Taking a live video as an example, a complete live video (that is, a video from the start of the live broadcast to the end of the live broadcast) is a video content, or the live video may be divided into multiple video contents according to a predetermined rule. For example, in a case that a live video involves multiple product recommendation contents, each of the product recommendation contents is a video content.

In step 102, the playback mode of the video stream is set to the target playback mode instructed by the playback mode switching instruction.

In step 103, in a case that the playback mode of the video stream is set to the automatic playback mode, a video content next to a current video content is played if it is detected that the current video content has been played.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the method according to the embodiment of the present disclosure, an automatic playback mode is supported. In the automatic playback mode, when it is detected that the current video content is played, the next video content is to be played automatically without requiring the user to manually switch, improving the convenience of the user's operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

Figure 2A:
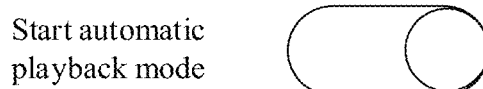
FIG. 2A is a schematic diagram showing a playback mode configuration control according to an embodiment of the present disclosure.
Figure 2B:
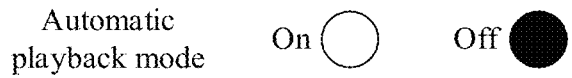
FIG. 2B is a schematic diagram showing a playback mode configuration control according to another embodiment of the present disclosure.

In the embodiments of the present disclosure, the types of the playback mode configuration control are not limited. In an embodiment, the playback mode configuration control may include a switch control shown in FIG. 2A. It is assumed that the current playback mode is a non-automatic playback mode, and a circular slider in the switch control is located at a right end of an elliptical sliding border. When the user clicks the switch control, a video stream playback application detects a trigger event of the switch control, the playback mode of the video stream is set to an automatic playback mode, and the circular slider in the switch control is slid to a left end of the elliptical sliding border (not shown in FIG. 2A). When the user clicks the switch control again, the video stream playback application detects a trigger event of the switch control, the playback mode of the video stream is set to the non-automatic playback mode, and the circular slider in the switch control is slid to the right end of the elliptical sliding border. In another embodiment, the playback mode configuration control may include selection controls shown in FIG. 2B. It is assumed that the current playback mode is a non-automatic playback mode, and the selection control corresponding to automatic playback mode "Off" is in a selected state. When the user clicks the selection control corresponding to automatic playback mode "On", a video stream playback application detects a trigger event of the switch control, the playback mode of the video stream is set to an automatic playback mode, and the selection control corresponding to the automatic playback mode "On" is changed to be in a selected state, and the selection control corresponding to the automatic playback mode "Off" is changed to be in an unselected state (not shown in FIG. 2B). It should be noted that, in the method according to the embodiments of the present disclosure, it is supported for the user to switch the playback mode of the video stream from the automatic playback mode to the non-automatic playback mode in other control manners. For example, in a case that a current playback mode of the video stream is the automatic playback mode, when a touch event is detected in the display region, it often indicates that it is currently convenient for the user to control the playback of the video stream by touching the screen. Therefore, the playback mode of the video stream is set to the non-automatic playback mode. In a case that the switch control shown in FIG. 2A is displayed, the circular slider is controlled to be at the right end of the elliptical sliding border. In a case that the selection controls shown in FIG. 2B are displayed, the selection control corresponding to the automatic playback mode "On" is controlled to be in the unselected state, and the selection control corresponding to the automatic playback mode "Off" is controlled to be in the selected state.

Further, the fixed menu bar region includes a left fixed menu bar region and/or a right fixed menu bar region. The left fixed menu bar region is located on a left side of a display region of the mobile display screen, and the right fixed menu bar region is located on a right side of the display region of the mobile display screen.

In practical applications, only the left fixed menu bar region or the right fixed menu bar region, or the left fixed menu bar region and the right fixed menu bar region may be configured according to product requirements. In a case that the left fixed menu bar region and the right fixed menu bar region are configured, whether to display the left fixed menu bar region and the right fixed menu bar region at the same time may be further configured. In the method according to the embodiments of the present disclosure, user-defined configuration of a fixed menu bar is supported.

Figure 3A:
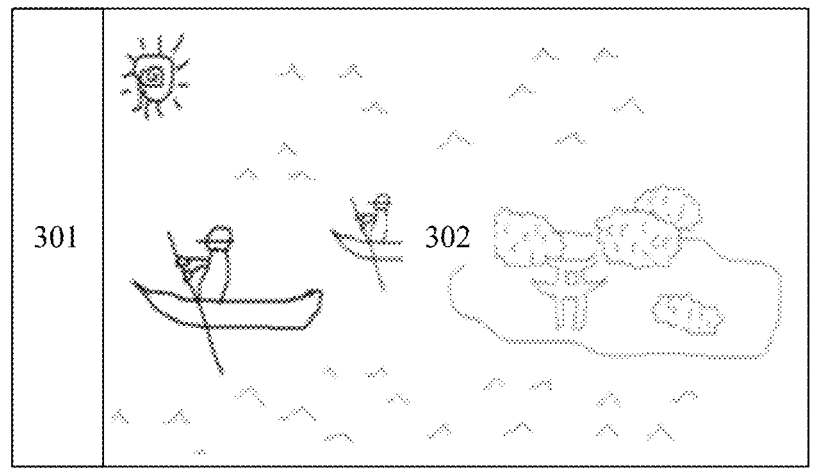
FIG. 3A is a schematic diagram showing a fixed menu bar region and a display region according to an embodiment of the present disclosure.
Figure 3B:
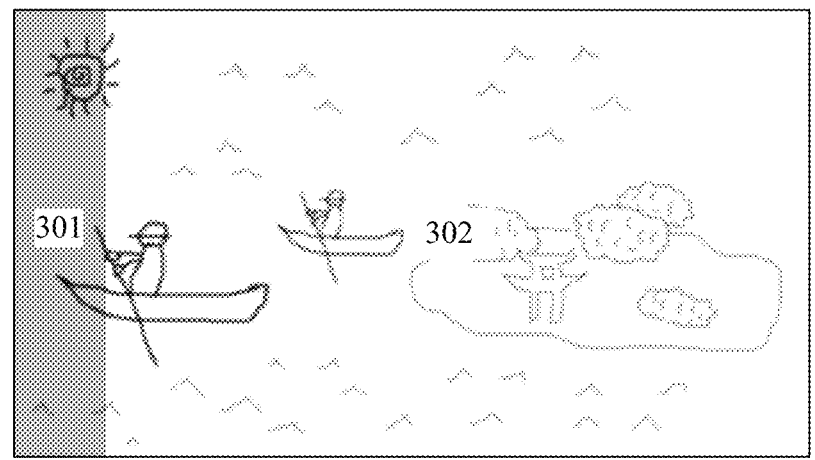
FIG. 3B is a schematic diagram showing a fixed menu bar region and a display region according to another embodiment of the present disclosure.

In the embodiments of the present disclosure, the fixed menu bar refers to a menu bar that is always displayed on front of the mobile display screen in operation of a video stream playback application or at least in playing a video stream. In the embodiments of the present disclosure, a position and a region ratio of the fixed menu bar region relative to the display region are not limited. Hereinafter, a left fixed menu bar region is taken as an example. In an embodiment, as shown in FIG. 3A, a left fixed menu bar region 301 is adjacent to a display region 302. In another embodiment, as shown in FIG. 3B, a left fixed menu bar region 301 is located in a display region 302 and is located at the left end of the display region 302, and the left fixed menu bar region 301 is displayed above the display region 302. Correspondingly, in order not to cover the video content displayed in the display region, the left fixed menu bar area 301 has a transparency not lower than a predetermined transparency threshold.

It is found that when the user holds a mobile terminal, it is more convenient for the user to operate in the region below the display screen than in other regions. Therefore, the fixed menu bar is usually arranged below the display screen. However, in the non-handheld usage scenario, it is often inconvenient for the user to operate in the region below the display screen, and it is convenient for the user to operate on both sides of the display screen. Therefore, in the method according to the embodiments of the present disclosure, the fixed menu bar region is arranged on a left side and/or a right side of the display region of the mobile display screen, so as to facilitate user operations.

In the embodiments of the present disclosure, controls displayed in the fixed menu bar are not limited. In practical applications, the controls displayed in the fixed menu bar are determined according to product requirements. In the method according to the embodiments of the present disclosure, it is supported for the user to configure the controls displayed in the fixed menu bar.

Further, the fixed menu bar region displays at least one control which may flexibly switch a display position by using the method according to the embodiments of the present disclosure. The method according to the embodiments of the present disclosure may further include: obtaining a menu bar display mode switching instruction, and displaying the at least one control in the left fixed menu bar region or the right fixed menu bar region based on the menu bar display mode switching instruction.

In the embodiments of the present disclosure, the content and form of the menu bar display mode switching instruction and the time instant at which the menu bar display mode switching instruction is obtained are not limited. As an example rather than limitation, the menu bar display mode switching instruction may include a touch instruction, a voice instruction, and the like. Specifically, the menu bar display mode switching instruction may be obtained by detecting a trigger event of a menu bar display mode selection control in the mobile display screen, or the menu bar display mode switching instruction may be received from other programs installed in an electronic device, or the menu bar display mode switching instruction may be received from other electronic devices.

Hereinafter, displaying a video stream on a vehicle-mounted screen is taken as an example. The video stream playback application may be installed on an in-vehicle computer, or installed on a mobile terminal (such as a smart phone) that controls the in-vehicle screen through the in-vehicle computer. After a video stream application is started, a menu bar display mode selection page is loaded and displayed, and a menu bar mode selection control is displayed on the menu bar display mode selection page. The user may choose to display in a right fixed menu bar region by using the menu bar mode selection control. After detecting the trigger event, the video stream application displays a control in the right fixed menu bar region. During the playback of the video stream, the user makes a speech with a semantic expression of "switching the fixed menu bar region display mode". A microphone of the smart phone or a microphone of the vehicle-mounted computer collects the speech and transmits the speech to the video stream application. The video stream application performs semantic analysis to obtain a menu bar display mode switching instruction, and displays the control in a left fixed menu bar display region. In another implementation, after the video stream application is started, a sensor installed on a seat of the vehicle detects whether there is a passenger on a co-pilot seat of the vehicle. In a case that the sensor detects that there is a passenger on the co-pilot seat, the detection result may be used as a menu bar display mode switching instruction for displaying the control in the right fixed menu bar display region. In a case that the sensor detects that there is no passenger on the co-pilot seat, the detection result may be used as a menu bar display mode switching instruction for displaying the control in the left fixed menu bar display region.

In the method according to the embodiments of the present disclosure, the complexity and variability of actual application scenarios are fully considered. In some application scenarios, it is convenient for the user to operate in the region on the left side of the display region; and in other application scenarios, it is convenient for the user to operate in the region on the right side of the display region. In order to meet the requirements of different actual application scenarios, based on a menu bar display mode switching instruction, a control in the fixed menu bar region may be switched to the left fixed menu bar region or the right fixed menu bar region that is convenient for the user to operate.

In one implementation, the at least one control includes a playback mode configuration control. In another implementation, the at least one control includes a display entry control of a play mode configuration control.

In the method according to the embodiments of the present disclosure, the playback mode configuration control or the display entry control of the play mode configuration control is switched to be displayed in the left fixed menu bar region or the right fixed menu bar region in response to the menu bar display mode switching instruction, thus it is convenient for the user to switch the playback mode.

Figure 4A:
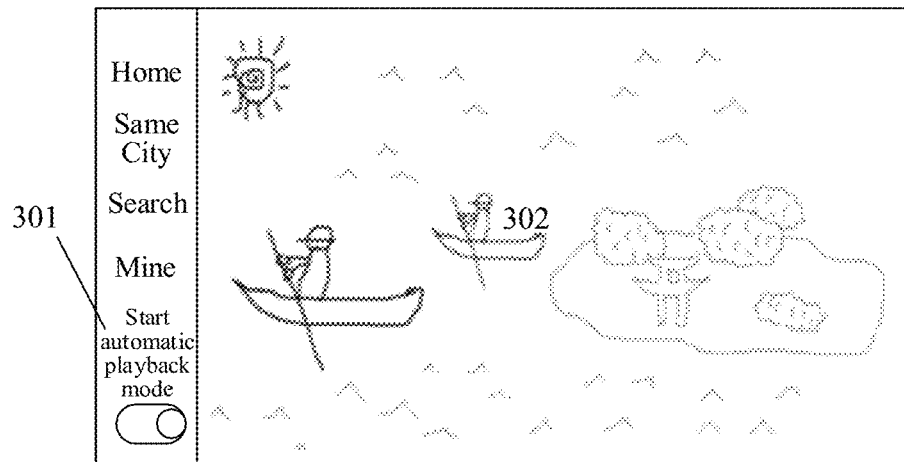
FIG. 4A is a schematic diagram showing controls in a left fixed menu bar region according to an embodiment of the present disclosure.
Figure 4B:
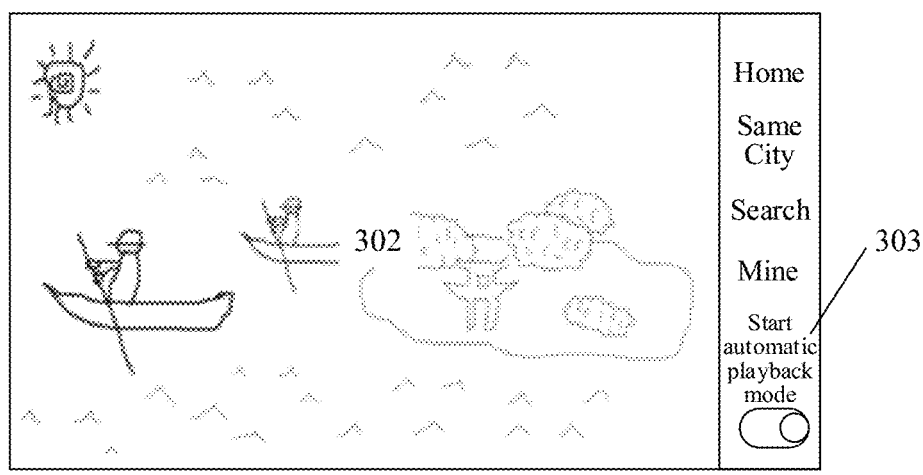
FIG. 4B is a schematic diagram showing controls in a right fixed menu bar region according to an embodiment of the present disclosure.

In an embodiment, the controls displayed on the fixed menu bar include: the playback mode configuration control shown in FIG. 2A, a "Home" control, a "Same City" control, a "Search" control, and a "Mine" control. In a case of triggering the "Home" control, the video stream is played based on a first predetermined strategy; in a case of triggering the "Same City" control, the video stream is played based on a second predetermined strategy, and the second predetermined strategy is determined at least based on a current position of the mobile display screen; in a case of triggering the "Search" control, a search function is called; and in a case of triggering the "Mine" control, a personal home page is loaded and displayed. FIG. 4A shows all the above controls. By default, as shown in FIG. 4A, these controls are displayed in the left fixed menu bar region. After the menu bar display mode switching instruction is received and the instruction instructs to switch to the right fixed menu bar region, the above controls are switched to be displayed in the right fixed menu bar region 303 as shown in FIG. 4B. Correspondingly, the display region 302 is moved to the left, that is, the left fixed menu bar region and the right fixed menu bar region are not appeared at the same time.

Figure 4C:
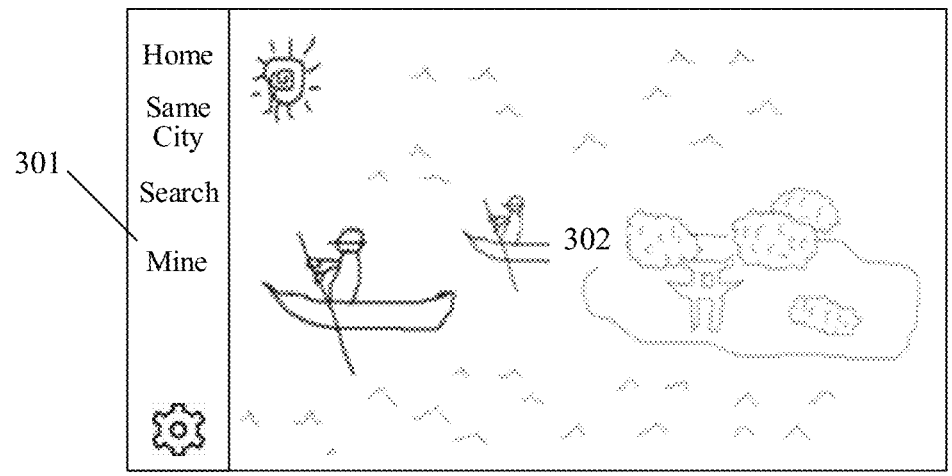
FIG. 4C is a schematic diagram showing controls in a left fixed menu bar region according to another embodiment of the present disclosure.
Figure 4D:
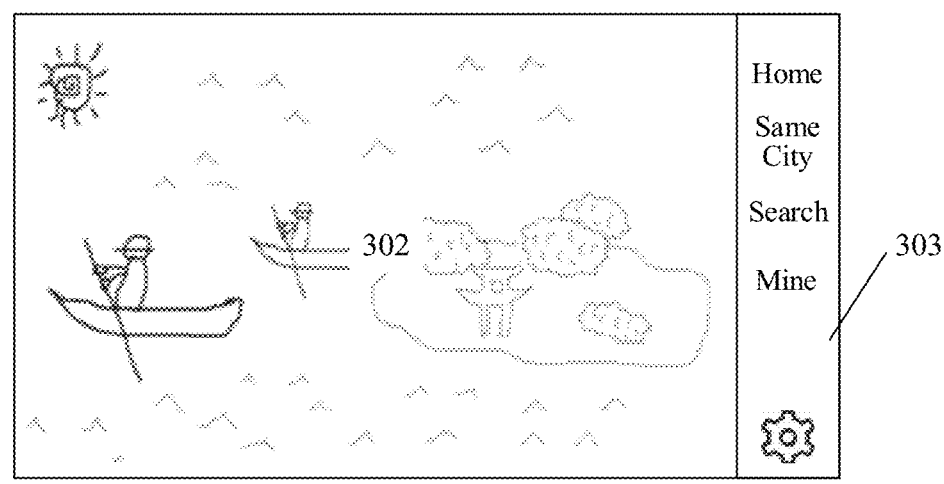
FIG. 4D is a schematic diagram showing controls in a right fixed menu bar region according to another embodiment of the present disclosure.

In another embodiment, the controls displayed on the fixed menu bar include: a "Home" control, a "Same City" control, a "search" control, a "Mine" control, and a system configuration control (that is, a gear icon in FIGS. 4C and 4D). In a case of triggering the "Home" control, the video stream is played based on a first predetermined strategy; in a case of triggering the "Same City" control, the video stream is played based on a second predetermined strategy, and the second predetermined strategy is determined at least based on a current position of the mobile display screen; in a case of triggering the "Search" control, a search function is called; in a case of triggering the "Mine" control, a personal home page is loaded and displayed; and in a case of triggering the system configuration control, a system configuration page is loaded and displayed. A play mode configuration control is displayed in the system configuration page or in a lower-level page of the system configuration page, and the system configuration control is a display entry control of the play mode configuration control. FIG. 4C shows all the above controls. By default, as shown in FIG. 4C, these controls are displayed in the left fixed menu bar region. After the menu bar display mode switching instruction is received and the instruction instructs to switch to the right fixed menu bar region, the above controls are switched to be displayed in the right fixed menu bar region 303 as shown in FIG. 4D. Correspondingly, the display region 302 is moved to the left, that is, the left fixed menu bar region and the right fixed menu bar region are not appeared at the same time.

As mentioned above, a display entry of the playback mode configuration control may be set in the fixed menu bar region, including the following situations. The playback mode configuration control is directly displayed in the fixed menu bar region. Alternatively, a display entry control of the playback mode configuration control is displayed in the fixed menu region, and the playback mode configuration control may be directly or indirectly displayed by triggering the display entry control, such as the system configuration control.

Based on the method according to any of the above embodiments, in a case that the playback mode of the video stream is set to the automatic playback mode, the method according to the embodiments of the present disclosure further includes: obtaining a target playback instruction, where the target playback instruction is not a touch control instruction detected in the playback region, and the target playback instruction instructs to perform a target playback operation; and performing the target playback operation on the video stream.

In the embodiments of the present disclosure, the target playback operation is an operation performed for video stream playback. The target playback operation may include, but is not limited to, at least one of the following: an operation of switching playback mode, an operation of stopping playback, a playback operation, an operation of marking a video content, and the like. The operation of stopping playback may further include: an operation of pausing playback and an operation of exiting playback. The operation of exiting playback is performed to exiting playback of a video stream. In practical applications, the operations of controlling the playback with the method in the embodiments of the present disclosure may be determined according to product requirements.

In a case that the playback mode of the video stream is set to the automatic playback mode, it may be required for the user to perform other playback control operations on the video stream, such as stopping playing a video content, and resuming playing a video content, and switching video content in a case that a current video content is not finished playing. In order to further improve the convenience of controlling playback and reducing the difficulty of controlling playback, a target playback instruction may be obtained in the method for controlling video stream playback according to the embodiments of the present disclosure. The target playback instruction is not a touch control instruction detected in the playback region of the mobile display screen. A target playback operation is performed based on the target playback instruction to control the playback of the video stream, thereby controlling video stream playback in a non-touch mode. The method is applied in a non-handheld usage scenario, solving the problem of high difficulty of controlling video stream playback caused by touching the screen.

In an embodiment, the target playback instruction may be obtained by detecting a trigger event of the target playback instruction.

In the embodiment, the detected trigger event of the target playback instruction may be determined as the target playback instruction.

In another embodiment, the target playback instruction may be obtained by: obtaining information received by an electronic device connected in a local area network where the mobile display screen is located, determining a current scenario mode based on the information, determining the current scenario mode as s target scenario mode, and obtaining a target playback instruction corresponding to the target scenario mode.

In another embodiment, the target playback instruction may be received from an electronic device including the mobile display screen, where the target playback instruction is transmitted by the electronic device based on a detected trigger event of the target playback instruction. For example, a detected trigger event of a target playback instruction detected by an operating system of a vehicle-mounted computer, then the target playback instruction is generated and transmitted to a video stream playback application installed on the vehicle-mounted computer.

In another embodiment, the target playback instruction may be received from a central control electronic device connected in a local area network where the mobile display screen is located. The target playback instruction is transmitted by the central control electronic device after determining that a current scenario mode is a target scenario mode. The central control electronic device determines the current scenario mode based on information received by at least one electronic device connected in the local area network, and then determines whether the current scenario mode is a target scenario mode. The central control electronic device is configured to control other electronic devices in the local area network. The central control electronic device may be the electronic device including the mobile display screen, or may be other electronic devices. For example, a smart speaker including a display screen determines a current scenario mode based on information received by at least one electronic device connected to the local area network, and the smart speaker, after determining that the current scenario mode is a target scenario mode, transmits a target playback instruction corresponding to the target scenario mode to a video stream playback application installed in the smart speaker.

In the embodiments of the present disclosure, the determining a current scenario mode based on information is not limited. A scenario mode matching the obtained information may be determined as the current scenario mode based on a matching condition such as a regular expression. Alternatively, a scenario mode identification model may be pre-trained, and then the obtained information is inputted to the scenario mode identification model to obtain the current scenario mode.

In the embodiments of the present disclosure, the content of the information for determining the scenario mode is not limited. In practical applications, the information for determining the scenario mode is configured according to the product requirements. For example, the information may include session request information of a smart phone connected to the local area network, ringing information of a smart doorbell connected to the local area network, and so on.

In the embodiments of the present disclosure, the scenario modes and the corresponding relationship between the scenario modes and the target playback instructions are not limited. In practical applications, the scenario modes are defined according to the product requirements, and the corresponding relationship between the scenario mode and the target playback instructions is determined according to the product requirements. It supports for the user to define the scenario modes and the target playback instructions corresponding to the scenario modes. For example, the scenario modes include: an incoming call scenario, a visiting scenario, and other scenarios. The incoming call scenario and the visiting scenario are the target scenario modes, the target playback instruction corresponding to the incoming call scenario is a pause playback instruction, and the play instruction corresponding to the visiting scenario is a quit playing instruction.

In a case that the scenario modes corresponding to different information and the target playback instruction corresponding to the target scenario mode are defined in advance, the current scenario mode may be identified during playing the video stream, and the playback of the video stream may be automatically controlled based on the current scenario mode, thereby meeting the requirements of the current scenario.

With the method according to the embodiment of the present disclosure, the manners in which the video stream is controlled are enriched, meeting the requirements of the non-handheld usage scenario.

In an embodiment, the obtaining a target playback instruction by detecting a trigger event of the target playback instruction may include: obtaining the target playback instruction based on a trigger event of the target playback instruction detected by a sensor of an electronic device including the mobile display screen.

In the method according to the embodiment of the present disclosure, the sensor in the electronic device where the mobile display screen is arranged is used to detect a trigger event of the target playback instruction, enriching the manners in which the video stream is controlled, thereby meeting the requirements of the non-handheld usage scenario.

In an embodiment, the obtaining a target playback instruction by detecting a trigger event of the target playback instruction may include: obtaining the target playback instruction based on a trigger event of the target playback instruction detected by a sensor of an electronic device connected in a local area network where the mobile display screen is located.

In the method according to the embodiment of the present disclosure, the sensor in the electronic device connected in a local area network where the mobile display screen is located is used to detect a trigger event of the target playback instruction, enriching the manners in which the video stream is controlled, thereby meeting the requirements of the non-handheld usage scenario.

In the embodiments of the present disclosure, the sensor involved in playback control is not limited. In practical applications, the sensor involved in the playback control may be determined according to product requirements, software and hardware usage rights, software and hardware support capabilities, and the like. As an example rather than limitation, the sensor may be a voice detection sensor (such as, a microphone), an image capture sensor, a lidar, a touch sensor, a target button, a speed sensor, and the like.

The trigger event of the target playback instruction detected by the sensor may include, but is not limited to, at least one of: a target voice command detected by the voice detection sensor, target facial features detected by the image capture sensor, a first target gesture feature detected by the image capture sensor, a second target gesture feature detected by the touch sensor, a target trigger event of a target physical button detected by the target button where the target button is not a touch button on the mobile display screen, and target speed features detected by the speed sensor on the electronic device including the mobile display.

The target facial features may include expression features and/or eye features.

The target button may include a physical button and/or a touch button.

In a case that the target playback instruction is obtained based on the target speed features detected by the speed sensor on the electronic device including the mobile display screen and a speed indicated by the target speed features reaches or exceeds a predetermined first speed threshold, the target playback instruction may include: a playback instruction that instructs to pause playing a video stream, or a playback instruction that instructs to stop playing a video stream, or a playback instruction that instructs to quit playing a video stream.

In a case that the target playback instruction is obtained based on the target speed features detected by the speed sensor on the electronic device including the mobile display screen and a speed indicated by the target speed features reaches or is lower that a predetermined second speed threshold, the target playback instruction may include: a playback instruction that instructs to play a video stream.

The second speed threshold is less than the first speed threshold.

With the method according to the embodiments of the present disclosure, the playback of the video stream is controlled based on a moving speed of an electronic device including the mobile display screen, thereby improving the safety during traveling.

Based on the method according to any of the above embodiments, the video stream includes multiple video contents, and the method may further include: determining whether a screen display mode of each of the video contents of the video stream matches a screen type of the mobile display screen, and filtering out a video content having a screen display mode not matching the screen type. The screen type includes a horizontal screen type and a vertical screen type, a screen display mode matching the horizontal screen type is a horizontal screen display mode, and a screen display mode matching the vertical screen type is a vertical screen display mode.

Figure 5A:
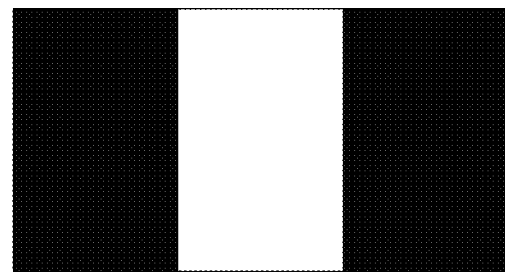
FIG. 5A is a schematic diagram of displaying a video content in a vertical screen display mode on a horizontal screen.
Figure 5B:
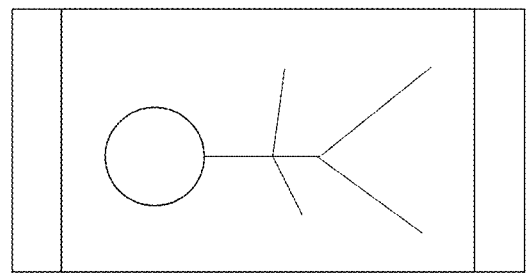
FIG. 5B is a schematic diagram of displaying a video content in a vertical screen display mode on a horizontal screen.

Taking a horizontal screen as an example, a video content in vertical screen display mode is to be played on the horizontal screen. In a case shown in FIG. 5A, in order to adapt to horizontal screen viewing habits, the video content is to be displayed at a reduced scale, resulting in a small display screen of the video content, affecting the user experience and affecting the safety in a driving environment. In another case shown in FIG. 5B, not adapting to horizontal screen viewing habits, the video content is to be displayed at an original scale, affecting the user experience and affecting the safety in a driving environment. However, with the method according to the embodiments of the present disclosure, the video content in the vertical screen display mode is to be filtered out, and only the video content in the horizontal screen display mode is to be displayed, avoiding the cases shown in FIGS. 5A and 5B, thereby improving user experience and safety.

Figure 6:
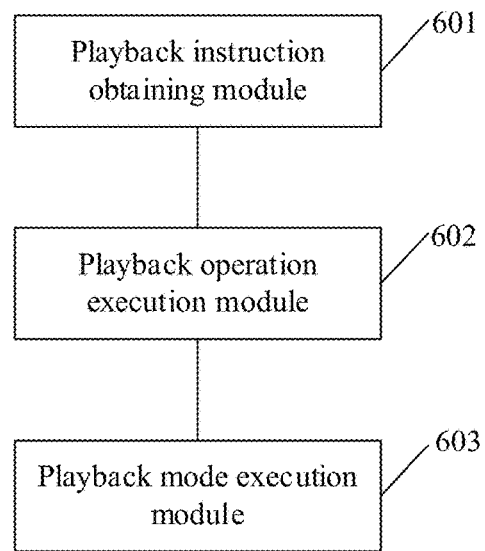
FIG. 6 is a block diagram of an electronic apparatus according to an embodiment of the present disclosure.

Based on the same concept as the method, an electronic apparatus is provided according to an embodiment of the present disclosure, which may include an electronic device including the mobile display screen and may include an electronic device playing a video stream through the mobile display screen. As shown in FIG. 6, the electronic apparatus according to the embodiment of the present disclosure includes: a playback instruction obtaining module 601, a playback operation execution module 602 and a playback mode execution module 603. In playing a video stream in a playback region of a mobile display screen of the electronic apparatus, the playback instruction obtaining module 601 is configured to obtain a playback mode switching instruction based on a detected trigger event of a playback mode configuration control, where a display entry of the playback mode configuration control is located in a fixed menu bar region of the mobile display screen, the playback mode switching instruction instructs to switch a playback mode of the video stream to a target playback mode, the target playback mode includes at least an automatic playback mode in which a video content is automatically switched, and the video stream includes multiple video contents; the playback operation execution module 602 is configured to set the playback mode of the video stream to the target playback mode instructed by the playback mode switching instruction; and the playback mode execution module 603 is configured to, in a case that the playback mode of the video stream is set to the automatic playback mode, play a video content next to a current video content if it is detected that the current video content has been played.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the electronic apparatus according to the embodiment of the present disclosure, an automatic playback mode is supported. In the automatic playback mode, when it is detected that the current video content is played, the next video content is to be played automatically without requiring the user to manually switch, improving the convenience of the user's operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

Further, the fixed menu bar region includes a left fixed menu bar region and/or a right fixed menu bar region. The left fixed menu bar region is located on a left side of a display region of the mobile display screen, and the right fixed menu bar region is located on a right side of the display region of the mobile display screen.

It is found that when the user holds a mobile terminal, it is more convenient for the user to operate in the region below the display screen than in other regions. Therefore, the fixed menu bar is usually arranged below the display screen. However, in the non-handheld usage scenario, it is often inconvenient for the user to operate in the region below the display screen, and it is convenient for the user to operate on both sides of the display screen. Therefore, in the electronic apparatus according to the embodiments of the present disclosure, the fixed menu bar region is arranged on a left side and/or a right side of the display region of the mobile display screen, so as to facilitate user operations.

Further, the fixed menu bar region displays at least one control. The electronic apparatus according to the embodiment of the present disclosure may further include: a menu bar display mode switching module. The menu bar display mode switching module is configured to obtain a menu bar display mode switching instruction, and display the at least one control in the left fixed menu bar region or the right fixed menu bar region based on the menu bar display mode switching instruction.

In the electronic apparatus according to the embodiments of the present disclosure, the complexity and variability of actual application scenarios are fully considered. In some application scenarios, it is convenient for the user to operate in the region on the left side of the display region; and in other application scenarios, it is convenient for the user to operate in the region on the right side of the display region. In order to meet the requirements of different actual application scenarios, based on a menu bar display mode switching instruction, a control in the fixed menu bar region may be switched to the left fixed menu bar region or the right fixed menu bar region that is convenient for the user to operate.

Based on the electronic apparatus according to any of the above embodiments, the playback instruction obtaining module is further configured to, in a case that the playback mode of the video stream is set to the automatic playback mode, obtain a target playback instruction, where the target playback instruction is not a touch control instruction detected in the playback region, and the target playback instruction instructs to perform a target playback operation; and the playback operation execution module is further configured to, in the case that the playback mode of the video stream is set to the automatic playback mode, perform the target playback operation on the video stream.

In a case that the playback mode of the video stream is set to the automatic playback mode, it may be required for the user to perform other playback control operations on the video stream, such as stopping playing a video content, and resuming playing a video content, and switching video content in a case that a current video content is not finished playing. In order to further improve the convenience of controlling playback and reducing the difficulty of controlling playback, a target playback instruction may be obtained in the electronic apparatus according to the embodiments of the present disclosure. The target playback instruction is not a touch control instruction detected in the playback region of the mobile display screen. A target playback operation is performed based on the target playback instruction to control the playback of the video stream, thereby controlling video stream playback in a non-touch mode. The electronic apparatus is applied in a non-handheld usage scenario, solving the problem of high difficulty of controlling video stream playback caused by touching the screen.

In an embodiment, the playback instruction obtaining module is configured to obtain the target playback instruction based on a trigger event of the target playback instruction detected by a sensor of an electronic device including the mobile display screen.

In the electronic apparatus according to the embodiment of the present disclosure, the sensor on the electronic device where the mobile display screen is arranged is used to detect a trigger event of the target playback instruction, enriching the manners in which the video stream is controlled, thereby meeting the requirements of the non-handheld usage scenario.

In another embodiment, the playback instruction obtaining module is configured to obtain the target playback instruction based on a trigger event of the target playback instruction detected by a sensor of an electronic device connected in a local area network where the mobile display screen is located.

In the electronic apparatus according to the embodiment of the present disclosure, the sensor on the electronic device connected in a local area network where the mobile display screen is located is used to detect a trigger event of the target playback instruction, enriching the manners in which the video stream is controlled, thereby meeting the requirements of the non-handheld usage scenario.

The trigger event of the target playback instruction detected by the sensor may include, but is not limited to, at least one of: a target voice command detected by the voice detection sensor, target facial features detected by the image capture sensor, a first target gesture feature detected by the image capture sensor, a second target gesture feature detected by the touch sensor, a target trigger event of a target physical button detected by the target button where the target button is not a touch button on the mobile display screen, and target speed features detected by the speed sensor on the electronic device including the mobile display.

In a case that the playback instruction obtaining module obtains the target playback instruction based on the target speed features detected by the speed sensor on the electronic device including the mobile display screen and a speed indicated by the target speed features reaches or exceeds a predetermined first speed threshold, the target playback instruction may include: a playback instruction that instructs to pause playing a video stream, or a playback instruction that instructs to stop playing a video stream, or a playback instruction that instructs to quit playing a video stream. In a case that the playback instruction obtaining module obtains the target playback instruction based on the target speed features detected by the speed sensor on the electronic device including the mobile display screen and a speed indicated by the target speed features reaches or is lower that a predetermined second speed threshold, the target playback instruction may include: a playback instruction that instructs to play a video stream.

The second speed threshold is less than the first speed threshold.

With the electronic apparatus according to the embodiments of the present disclosure, the playback of the video stream is controlled based on a moving speed of an electronic device including the mobile display screen, thereby improving the safety during traveling.

In another embodiment, the playback instruction obtaining module is configured to obtain the target playback instruction by: obtaining information received by an electronic device connected in a local area network where the mobile display screen is located, determining a current scenario mode based on the information, determining the current scenario mode as a target scenario mode, and obtaining a target playback instruction corresponding to the target scenario mode.

With the electronic apparatus according to the embodiment of the present disclosure, the manners in which the video stream is controlled are enriched, meeting the requirements of the non-handheld usage scenario.

In a case that the scenario modes corresponding to different information and the target playback instruction corresponding to the target scenario mode are defined in advance, the current scenario mode may be identified during playing the video stream, and the playback of the video stream may be automatically controlled based on the current scenario mode, thereby meeting the requirements of the current scenario.

Based on the electronic apparatus according to any of the above embodiments, the video stream includes multiple video contents, and the electronic apparatus may further include a video content filtering module. The video content filtering module is configure to determine whether a screen display mode of each of the video contents of the video stream matches a screen type of the mobile display screen, and filter out a video content having a screen display mode not matching the screen type. The screen type includes a horizontal screen type and a vertical screen type, a screen display mode matching the horizontal screen type is a horizontal screen display mode, and a screen display mode matching the vertical screen type is a vertical screen display mode.

With the electronic apparatus according to the embodiments of the present disclosure, the video content that does not match the screen type of the mobile display screen may be filtered out, so that the screen display modes of the played video content are matched with the screen type, thereby improving the user experience and security.

The above modules may be implemented as software components that are executed on one or more general-purpose processors, or may be implemented, for example, as hardware that performs certain functions or combinations thereof, as programmable logic devices and/or application specific integrated circuits. In some embodiments, these modules may be implemented in the form of a software product, and the software product may be stored in a non-volatile storage media. The non-volatile storage media stores the method according to the embodiments of the present disclosure which may be performed by a computer device (such as, a personal computer, a server, a network device, and a mobile terminal). In an embodiment, the modules may be implemented in a single device, or may be distributed in multiple devices. The functions of the modules may be combined with each other or may be further split into multiple sub-modules.

The electronic apparatus according to the embodiments may include a vehicle-mounted computer arranged with the mobile display screen or playing video streams through the mobile display screen, a smart speaker, a smart phone, a PDA and a tablet computers that are arranged with the mobile display screen or playing video streams through the mobile display screen, a wearable device arranged with the mobile display screens, and the like.

Those skilled in the art may clearly understand that, for the convenience and brevity of description, the specific operation processes of the modules of the electronic apparatus described above may refer to the corresponding processes in the above method embodiments, which are not be repeated herein.

Based on the same concept as the method, an electronic device is provided according to an embodiment of the present disclosure. The electronic device includes a processor and a memory. The memory stores a program for executing the method according to any one of the above embodiments. The processor is configured to execute the program stored in the memory. The processing device may be a central processing unit (CPU) or a processing unit that is in another form and has a data processing capability and/or an instruction execution capability, and may control other components in the electronic device to perform functions. The memory may include one or more computer program products. The computer program products may include various forms of computer-readable storage media, such as volatile memory and/or non-volatile memory. The volatile memory may include, for example, a random access memory (RAM) and/or a cache memory. The non-volatile memory may include, for example, a read only memory (ROM), a hard disk, and a flash memory. The computer-readable storage medium may store one or more computer program instructions. The processor may execute the program instructions to perform the functions in the embodiments of the present disclosure and/or other desired functions.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the electronic device according to the embodiment of the present disclosure, an automatic playback mode is supported. In the automatic playback mode, when it is detected that the current video content is played, the next video content is to be played automatically without requiring the user to manually switch, improving the convenience of the users operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

Figure 7:
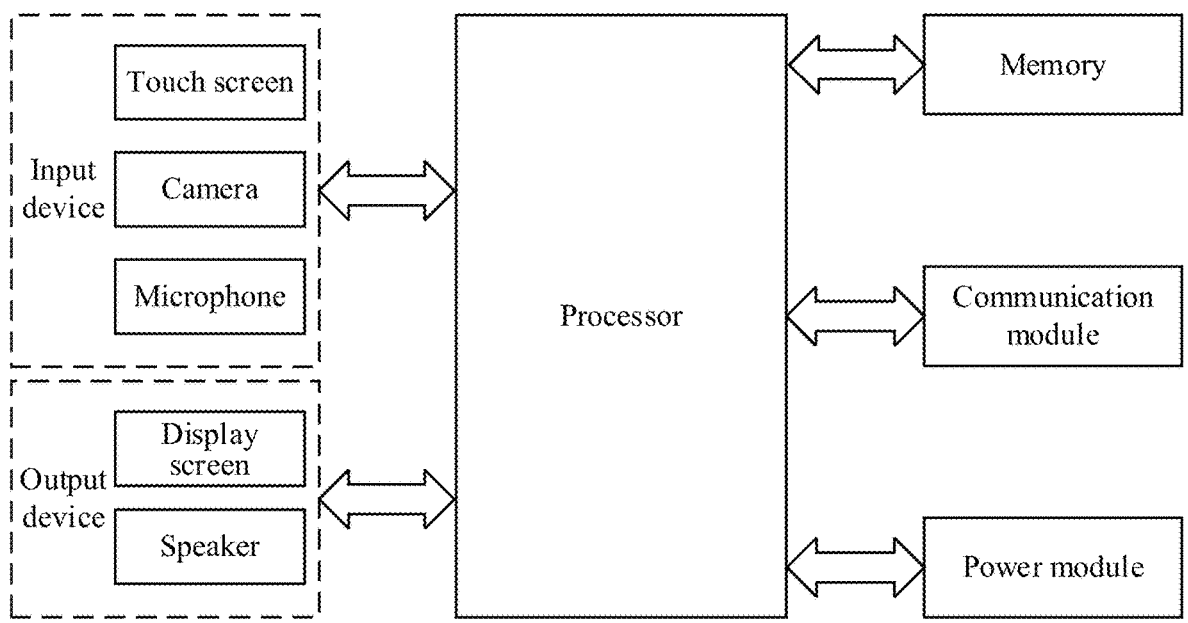
FIG. 7 is a schematic structural diagram of an electronic device according to an embodiment of the present disclosure.

The electronic device according to the embodiments may include a vehicle-mounted computer arranged with the mobile display screen or playing video streams through the mobile display screen, a smart speaker, a smart phone, a PDA and a tablet computers that are arranged with the mobile display screen or playing video streams through the mobile display screen, a wearable device arranged with the mobile display screens, and the like. As shown in FIG. 7, the electronic device includes a processor and a memory, an input device (such as a touch screen, a camera and a microphone), an output device (such as a display screen (that is, the mobile display screen) and a speaker), a communication module, and a power module.

The memory, the input device, the output device, the communication module and the power module are connected with the processor through serial ports, a bus or USB interfaces.

The memory of the mobile terminal may include, but is not limited to, a Flash memory, an RAM (random access memory), an ROM (read only memory), and the like. The RAM is configured to store programs and data required for the mobile terminal to operate. The programs to be executed or the data to be processed should be stored in the RAM in advance. The ROM is configured to check the configuration of the operation system of the mobile terminal and provide basic input and output (I/O) programs. The Flash memory is a long-life and non-volatile memory (which can still retain stored data information in a case of power failure), in which data is deleted in a unit of a fixed block rather than in a unit of a byte. Since the Flash memory can still store data in the case of power failure, the Flash memory is usually configured to store configuration information, such as configuration information of a mobile phone by the user.

It should be noted that different electronic devices may include more or less hardware structures than the mobile terminal shown in FIG. 7. As long as an electronic device includes a memory and a processor and is capable of performing the functions in the method embodiments, the electronic device is within the scope of the present disclosure.

Based on the same concept as the method, a computer-readable storage medium is provided according to an embodiment of the present disclosure. The computer-readable storage medium stores a program for executing the method described according to the above embodiments.

As mentioned above, after the current video content of the video stream is played, it is often required for the user to manually operate to switch to a next video content in a conventional manner. In the non-handheld usage scenario, it is inconvenient for the user to manually switching video contents frequently, increasing the difficulty of controlling video stream playback, and even bringing danger to the user in a certain scenario (such as in a driving scenario). Therefore, with the program stored in the computer-readable storage medium according to the embodiment of the present disclosure, an automatic playback mode is supported. In the automatic playback mode, when it is detected that the current video content is played, the next video content is to be played automatically without requiring the user to manually switch, improving the convenience of the users operation and reducing the difficulty of controlling the video stream playback. Further, in order to facilitate switching of the playback mode, a display entry of a play mode configuration control is arranged in a fixed menu bar region, so that the user may quickly trigger the play mode configuration control through the display entry arranged in the fixed menu bar region, thereby quickly switching the playback mode.

The specification is described with reference to flow charts illustrations and/or block diagrams of the method, apparatus (system), and computer program product according to the embodiments of the specification. It should be understood that each of flows and/or each of blocks in the flow charts and/or the block diagrams, and combinations of flows and/or blocks in the flow charts and/or block diagrams, may be implemented by computer program instructions. These computer program instructions may be provided to a processor of a general purpose computer, special purpose computer, embedded processor or other programmable data processing device to generate a machine, so that instructions executed by the computer or the processor of other programmable data processing device generates a device for performing the functions specified in a flow or multiple flows in the flowcharts and/or in a block or multiple blocks in the block diagrams.

These computer program instructions may be stored in a computer readable memory capable of directing a computer or other programmable data processing device to operate in a particular manner. The instructions stored in the computer-readable memory produce an article of manufacture including an instruction device. The instruction device performs the functions specified in a flow or multiple flows in the flowcharts and/or in a block or multiple blocks in the block diagrams.

These computer program instructions may be loaded in a computer or other programmable data processing device to cause the computer or the other programmable data processing device to perform operation steps to produce a computer-implemented process, so that the instructions executed on the computer or the other programmable device provide steps for implementing the functions specified in one or more flows in the flowcharts and/or one or more blocks in the block diagrams.

Although the preferred embodiments of this specification have been described, additional changes and modifications to these embodiments may be performed by those skilled in the art after obtaining the basic inventive concepts. Therefore, the appended claims are intended to be construed to include the preferred embodiment and all changes and modifications that fall within the scope of this specification.

Obviously, those skilled in the art may make various variations and modifications to this specification without departing from the spirit and scope of this specification. Thus, if these variations and modifications of the present specification fall within the scope of the claims of the present specification and technical equivalents thereof, the present specification is also intended to include these modifications and variations.

The invention claimed is:

1. A method for controlling video stream playback, wherein in playing a video stream in a playback region of a mobile display screen, the method comprises:
   obtaining a playback mode switching instruction based on a detected trigger event of a playback mode configuration control, wherein a display entry of the playback mode configuration control is located in a fixed menu bar region of the mobile display screen, wherein the fixed menu bar is always displayed on the mobile display screen during playing the video stream, wherein the fixed menu bar comprises a plurality of controls configured to play the video stream based on a plurality of corresponding strategies, wherein the plurality of controls in the fixed menu comprise a first control configured to play the video stream based on a first predetermined strategy and a second control configured to play the video stream based on determining a current position of the mobile display screen, wherein the playback mode switching instruction instructs to switch a playback mode of the video stream to a target playback mode, wherein the target playback mode comprises at least an automatic playback mode in which a video content is automatically switched, and wherein the video stream comprises a plurality of video contents;
   setting the playback mode of the video stream to the target playback mode instructed by the playback mode switching instruction; and
   when the playback mode of the video stream is set to the automatic playback mode, playing a video content next to a current video content in response to detecting that the current video content has been played.

2. The method according to claim 1,
   wherein the fixed menu bar region comprises a left fixed menu bar region or a right fixed menu bar region, the left fixed menu bar region is located on a left side of a display region of the mobile display screen, the right fixed menu bar region is located on a right side of the display region of the mobile display screen; and
   the method further comprises obtaining a menu bar display mode switching instruction, and displaying the plurality of controls in the left fixed menu bar region or the right fixed menu bar region based on the menu bar display mode switching instruction.

3. The method according to claim 1, wherein when the playback mode of the video stream is set to the automatic playback mode, the method further comprises:
   obtaining a target playback instruction, wherein the target playback instruction is not a touch control instruction detected in the playback region, and the target playback instruction instructs to perform a target playback operation; and
   performing the target playback operation on the video stream.

4. The method according to claim 3, wherein the obtaining a target playback instruction comprises:
   obtaining the target playback instruction based on a trigger event of the target playback instruction detected by a sensor of an electronic device comprising the mobile display screen; or
   obtaining the target playback instruction based on a trigger event of the target playback instruction detected by a sensor of an electronic device connected in a local area network where the mobile display screen is located; or
   obtaining information received by an electronic device connected in a local area network where the mobile display screen is located, determining a current scenario mode based on the information, determining the current scenario mode as a target scenario mode, and obtaining a target playback instruction corresponding to the target scenario mode.

5. The method according to claim 1, further comprising:
   determining whether a screen display mode of each of the video contents of the video stream matches a screen type of the mobile display screen, and filtering out a video content having a screen display mode not matching the screen type, wherein the screen type comprises a horizontal screen type and a vertical screen type, a screen display mode matching the horizontal screen type is a horizontal screen display mode, and a screen display mode matching the vertical screen type is a vertical screen display mode.

6. An electronic device, comprising:
   one or more processors; and
   a memory configured to store one or more programs;
   wherein when the one or more programs are executed by the one or more processors, in playing a video stream in a playback region of a mobile display screen, the one or more processors are caused to perform operations of:
   obtaining a playback mode switching instruction based on a detected trigger event of a playback mode configuration control, wherein a display entry of the playback mode configuration control is located in a fixed menu bar region of the mobile display screen, wherein the fixed menu bar is always displayed on the mobile display screen during playing the video stream, wherein the fixed menu bar comprises a plurality of controls configured to play the video stream based on a plurality of corresponding strategies, wherein the plurality of controls in the fixed menu comprise a first control configured to play the video stream based on a first predetermined strategy and a second control configured to play the video stream based on determining a current position of the mobile display screen, wherein the playback mode switching instruction instructs to switch a playback mode of the video stream to a target playback mode, wherein the target playback mode comprises at least an automatic playback mode in which a video content is automatically switched, and wherein the video stream comprises a plurality of video contents;

setting the playback mode of the video stream to the target playback mode instructed by the playback mode switching instruction; and when the playback mode of the video stream is set to the automatic playback mode, playing a video content next to a current video content in response to detecting that the current video content has been played.

7. The electronic device according to claim 6, wherein the fixed menu bar region comprises a left fixed menu bar region or a right fixed menu bar region, the left fixed menu bar region is located on a left side of a display region of the mobile display screen, the right fixed menu bar region is located on a right side of the display region of the mobile display screen; and wherein the operations further comprise obtaining a menu bar display mode switching instruction, and displaying the plurality of controls in the left fixed menu bar region or the right fixed menu bar region based on the menu bar display mode switching instruction.

8. The electronic device according to claim 6, wherein when the playback mode of the video stream is set to the automatic playback mode, the one or more processors also are caused to perform operations of:

obtaining a target playback instruction, wherein the target playback instruction is not a touch control instruction detected in the playback region, and the target playback instruction instructs to perform a target playback operation; and performing the target playback operation on the video stream.

9. The electronic device according to claim 8, wherein the obtaining a target playback instruction comprises:

obtaining the target playback instruction based on a trigger event of the target playback instruction detected by a sensor of an electronic device comprising the mobile display screen; or obtaining the target playback instruction based on a trigger event of the target playback instruction detected by a sensor of an electronic device connected in a local area network where the mobile display screen is located; or obtaining information received by an electronic device connected in a local area network where the mobile display screen is located, determining a current scenario mode based on the information, determining the current scenario mode as a target scenario mode, and obtaining a target playback instruction corresponding to the target scenario mode.

10. The electronic device according to claim 6, wherein the one or more processors also are caused to perform operations of:

determining whether a screen display mode of each of the video contents of the video stream matches a screen type of the mobile display screen, and filtering out a video content having a screen display mode not matching the screen type, wherein the screen type comprises a horizontal screen type and a vertical screen type, a screen display mode matching the horizontal screen type is a horizontal screen display mode, and a screen display mode matching the vertical screen type is a vertical screen display mode.

11. A non-transitory computer readable medium storing computer programs, wherein the programs are executed by a processor to perform operations of:

in playing a video stream in a playback region of a mobile display screen, obtaining a playback mode switching instruction based on a detected trigger event of a playback mode configuration control, wherein a display entry of the playback mode configuration control is located in a fixed menu bar region of the mobile display screen, wherein the fixed menu bar is always displayed on the mobile display screen during playing the video stream, wherein the fixed menu bar comprises a plurality of controls configured to play the video stream based on a plurality of corresponding strategies, wherein the plurality of controls in the fixed menu comprise a first control configured to play the video stream based on a first predetermined strategy and a second control configured to play the video stream based on determining a current position of the mobile display screen, wherein the playback mode switching instruction instructs to switch a playback mode of the video stream to a target playback mode, wherein the target playback mode comprises at least an automatic playback mode in which a video content is automatically switched, and wherein the video stream comprises a plurality of video contents;

setting the playback mode of the video stream to the target playback mode instructed by the playback mode switching instruction; and when the playback mode of the video stream is set to the automatic playback mode, playing a video content next to a current video content in response to detecting that the current video content has been played.

12. The non-transitory computer readable medium according to claim 11, wherein the fixed menu bar region comprises a left fixed menu bar region or a right fixed menu bar region, the left fixed menu bar region is located on a left side of a display region of the mobile display screen, the right fixed menu bar region is located on a right side of the display region of the mobile display screen;

wherein the operations further comprise obtaining a menu bar display mode switching instruction, and displaying the plurality of controls in the left fixed menu bar region or the right fixed menu bar region based on the menu bar display mode switching instruction.

13. The non-transitory computer readable medium according to claim 11, wherein when the playback mode of the video stream is set to the automatic playback mode, the operations further comprise:

obtaining a target playback instruction, wherein the target playback instruction is not a touch control instruction detected in the playback region, and the target playback instruction instructs to perform a target playback operation; and performing the target playback operation on the video stream.

14. The non-transitory computer readable medium according to claim 13, wherein the obtaining a target playback instruction further comprises:

obtaining the target playback instruction based on a trigger event of the target playback instruction detected by a sensor of an electronic device comprising the mobile display screen;

obtaining the target playback instruction based on a trigger event of the target playback instruction detected by a sensor of an electronic device connected in a local area network where the mobile display screen is located; or obtaining information received by an electronic device connected in a local area network where the mobile display screen is located, determining a current scenario mode based on the information, determining the current scenario mode as a target scenario mode, and obtaining a target playback instruction corresponding to the target scenario mode.

15. The non-transitory computer readable medium according to claim 11, wherein the operations further comprise:

determining whether a screen display mode of each of the video contents of the video stream matches a screen type of the mobile display screen, and filtering out a video content having a screen display mode not matching the screen type, wherein the screen type comprises a horizontal screen type and a vertical screen type, a screen display mode matching the horizontal screen type is a horizontal screen display mode, and a screen display mode matching the vertical screen type is a vertical screen display mode.

* * * * *